2,904,563

PREPARATION OF Δ⁹⁽¹¹⁾-ANHYDRO-STEROIDS FROM 11β-HYDROXY-STEROIDS

Earl M. Chamberlin, Westfield, and John M. Chemerda, Metuchen, N.J., assignors to Merck & Co., Inc., Rahway, N.J., a corporation of New Jersey No Drawing. Application July 29, 1954
Serial No. 446,664

3 Claims. (Cl. 260—397.45)

This invention relates to the prepartion of steroids, and particularly, to the preparation of $\Delta^{9(11)}$-anhydro-steroids from 11β-hydroxy-steroids.

It has been suggested to prepare $\Delta^{9(11)}$-anhydrosteroids from 11β-hydroxy-steroids by treating with phosphorous oxychloride in pyridine. It has also been suggested to carry out this reaction with a mixture of acetic acid and hydrochloric acid, as well as, with acetic acid alone in the presence of a catalyst, such as, hydrogen bromide. The effectiveness of these various methods depends to a large extent upon the particular 11β-hydroxy-steroid employed. In using the phosphorous oxychloride method, an 11β-hydroxy-pregnane will be converted to the corresponding $\Delta^{9(11)}$-anhydro-pregnene in relatively good yield, although it usually requires an extended period of time, at room temperature, to complete the reaction. When an 11β-hydroxy-$\Delta^4$-pregnene is converted to the corresponding $\Delta^{4,9(11)}$-anhydro-pregnadiene, the yield, however, is relatively small. A relatively high yield of product may be obtained after extensive reaction time, when the starting material is a compound having keto groups blocked, such as, at the 3 and 20 positions by a ketal formation. An example of this is the conversion of $\Delta^5$-pregnene-11β,17α,21-triol-3,20-dione-21-acetate-3,20-bis-ethylene ketal to the corresponding $\Delta^{5,9(11)}$-anhydro-pregnadiene. The use of a mixture of acetic acid and hydrochloric acid results in low yields of $\Delta^{9(11)}$-anhydro-steroid, although the reaction is relatively rapid. Acetic acid with a hydrogen bromide catalyst results in only fair yields and requires an extensive period of reaction time.

It has been suggested to subject 11α-hydroxy-steroids, after first acylating any 21-hydroxy group, to tosylation to form the corresponding 11α-tosylate compound. The latter compound is then reacted with sodium acetate and boiling acetic acid to form the corresponding $\Delta^{9(11)}$-anhydro-steroid. This reaction differs from the reactions mentioned above, in that, it requires two distinct steps to remove the 11α-hydroxy group and form a double bond at position 9(11). This method has not been applied to 11β-hydroxy-steroids, because when the hydroxy group is in the β configuration it is not subject to acylation, except under such severe conditions as to cause the destruction of the molecule. This is especially the case with a steroid having a 17-position side chain because of the recognized lability of such a side chain, and also with steriods having a double bond at the 4 position which would be expected to undergo reaction.

It is an object of this invention to provide a simplified procedure for converting 11β-hydroxy-steroids to the corresponding $\Delta^{9(11)}$-anhydro-steroid. It is another object to provide such a process whereby the conversion is carried out directly in one step in high yield. It is a further object of the invention to provide such a process, which can be applied to a broad group of steroids, with uniformly good results. Other objects and the advantages of the invention will appear hereinafter.

In accordance with the invention 11β-hydroxy-steroids are converted to the corresponding $\Delta^{9(11)}$-anhydro-steroid by treating with an organic sulfonyl chloride. The organic sulfonyl chloride is of the formula $RSO_2Cl$, wherein R is an alkyl group preferably having a carbon chain length of from one to eight carbon atoms. This reaction is surprising since the aryl sulfonyl chlorides do not yield the desired product. Typical examples of such compounds which may be mentioned are methanesulfonyl chloride, ethanesulfonyl chloride, propanesulfonyl chloride, butanesulfonyl chloride, heptanesulfonyl chloride, hexanesulfonyl chloride, octanesulfonyl chloride. The lower alkyl (from one to four carbon atom chain) sulfonyl chlorides are distinctly advantageous because the reaction many be carried out at more desirable conditions. The organic sulfonyl chloride is usually used in from one to ten moles per mole of 11β-hydroxy-steroid.

In a preferred embodiment of the invention, the reaction is carried out with the organic sulfonyl chloride in the presence of a tertiary amine type base. Typical examples of classes of such bases are pyridines; N-alkyl-morpholines; N-alkyl-piperidines; lutidines; collidines; and trialkylamines. Of particular mention are the more readily available members of these groups, such as pyridine; N-methylmorpholine; N-ethylmorpholine; α,γ-lutidine; collidine; nicotine; trimethylamine; triethylamine; tripropylamine; dimethylaniline; diethylaniline; N-amylpiperidine; N-butylpiperidine; N-ethylpiperidine; N-methylpiperidine; N-heptylpiperidine; and N-propylpiperidine. The base is preferably present in from one to ten moles for each mole of steroid. The base selected is preferably one that is also a solvent for the 11β-hydroxy-steroid, such as pyridine or lutidine. The ability of any of the bases to act as a solvent for the steroid under the conditions of the reaction may be readily determined by a simple solubility test.

The reaction is conveniently carried out in a solvent for the steriod. The solvent, as mentioned above, may also serve as the base. The solvent may also be a mixture of a hydrocarbon and a base, such as benzene-pyridine mixture or a mixture of a chlorinated hydrocarbon and a base, such as methylene chloride and pyridine. Other solvents which may be mentioned are dimethylformamide, dimethylacetamide, chloroform, acetone, propylene glycol, methyl ethyl ketone and anhydrous mixtures of these solvents.

The time required for the reaction will depend, in part, upon the particular reactants, solvents, and temperatures. At room temperature of 25° to 30° C., the reaction usually requires approximately 10 to 18 hours when a lower alkyl sulfonyl chloride is used. At temperatures of from 55° to 60° C., the time may be reduced to two to ten hours.

Any of the 11β-hydroxy-steroids, and particularly, the pregnanes and pregnenes may be converted to the corresponding $\Delta^{9(11)}$-anhydro-steroid. The reaction is very effective with the 11β-hydroxy-$\Delta^4$-pregnenes, which makes the process of particular value, since heretofore a process for converting these types of compounds in high yield and in relatively short reaction time was not available. The presence of various substituents in the steroid molecule, such as 3,20-keto groups; 3,17α-hydroxy groups; and ring double bonds, does not interfere with the reaction. It is desirable, however, if there is a 21-hydroxy group to convert it to the corresponding 21-ester compound. Particular examples of 11β-hydroxy-steroids are the 21-esters of $\Delta^4$-pregnene-11β,17α,21-triol-3,20-dione, such as the acetate, propionate, formate, butyrate, benzoate, t-butylacetate, hemisuccinate and phenylacetate esters; $\Delta^4$-pregnene-11β,17α-diol-3,20-dione, $\Delta^4$-pregnene-11β-ol-3,20-dione; $\Delta^4$-pregnene-11β,21-diol-3,20-dione-21-acetate; acetate esters of $\Delta^4$-pregnene-11β,17α,21-triol-3,20-dione; $\Delta^4$-androstene-11β-ol-3,17-dione; $\Delta^4$-pregnene-11β,17α,21-triol-3,20-dione; pregnane-11β-ol-3, 20-dione; pregnane - 11β,21 - diol-3,20-dione-21-acetate; pregnane-11β,17α,21-triol-3,20-dione; allopregnane-11β,17α,21-triol-3,20-dione; Δ⁵-pregnene-3β,11β-diol-20-one, and Δ⁵-pregnene-11β,17α,21-triol-3,20-dione-21-acetate-3,20-bis-ethylene ketal.

The following examples are given for purposes of illustration:

Example 1

One gram of Δ⁴-pregnene-11β,17α,21-triol-3,20-dione-21-acetate was dissolved in 10 cc. of dry pyridine and 0.5 cc. of methanesulfonyl chloride was added. After standing for 16 hours, at normal room temperature, the reaction mixture was poured into 400 cc. of water and extracted with 100 cc. and 75 cc. of ethyl acetate. The ethyl acetate extract was washed with 2.5 N hydrogen chloride (100 cc.), water (100 cc.) and dried over magnesium sulfate. The solvent was removed in vacuo and afforded a crystalline residue which was recrystallized from methanol-chloroform. Melting point 221°–227° C. Infrared spectrum same as infrared spectrum of an authentic sample of $\Delta^{4,9(11)}$-pregnadiene-17α,21-diol-3,20-dione 21 acetate.

Example 2

Five grams of 4-pregnene-11β,17α,21-triol-3,20-dione 21-acetate were added to 25 cc. of dimethylformamide. The substance dissolved and then a solid separated. Pyridine (2 cc.) was added followed by 2.5 cc. of methanesulfonyl chloride. The reaction mixture was shaken for fifteen minutes and allowed to stand for 16 hours at normal room temperature. The reaction mixture was diluted with 500 cc. of ethyl acetate and washed with 160 cc. of 2.5 N hydrogen chloride. An emulsion resulted and 300 cc. of methylene chloride was added. The methylene chloride-ethyl acetate solution was then washed with water and saturated sodium bicarbonate solution. After drying over magnesium sulfate anhydrous the solvent was removed in vacuo to give a crude yield of 5.0 gm. Recrystallization from methylene chloride-methanol afforded 3.0 g. (62%) of product, melting point 220°–225° C.

Any departure from the above description, which conforms to the present invention, is intended to be included within the scope of the claims.

What is claimed is:

1. In a process for the conversion of a 21-lower aliphatic carboxylic ester of Δ⁴-pregnene-11β,17α,21-triol-3,20-dione to a 21-lower aliphatic carboxylic ester of $\Delta^{4,9(11)}$-pregnadiene-17α,21-diol-3,20-dione by reaction with methanesulfonyl chloride in the presence of a tertiary amine, the improvement which comprises carrying out the reaction in the presence of dimethylformamide.

2. In a process for the conversion of a 21-lower aliphatic carboxylic ester of Δ⁴-pregnene-11β,17α,21-triol-3,20-dione to a 21-lower aliphatic carboxylic ester of $\Delta^{4,9(11)}$-pregnadiene-17α,21-diol-3,20-dione by reaction with methanesulfonyl chloride in the presence of pyridine, the improvement which comprises carrying out the reaction in the presence of dimethylformamide.

3. In a process for the conversion of Δ⁴-pregnene-11β,17α,21-triol-3,20-dione 21-acetate to $\Delta^{4,9(11)}$-pregnadiene-17α,21-diol-3,20-dione 21-acetate by reaction with methanesulfonyl chloride in the presence of pyridine, the improvement which comprises carrying out the reaction in the presence of dimethylformamide.

References Cited in the file of this patent

UNITED STATES PATENTS

| | | |
|---|---|---|
| 2,409,798 | Reichstein | Oct. 22, 1946 |
| 2,509,248 | Sarett | May 30, 1950 |
| 2,640,838 | Wendler | June 2, 1953 |
| 2,640,839 | Wendler | June 2, 1953 |
| 2,763,671 | Fried et al. | Sept. 18, 1956 |

FOREIGN PATENTS

| | | |
|---|---|---|
| 245,269 | Switzerland | July 1, 1947 |

OTHER REFERENCES

Fieser et al.: Natural Products Related to Phenanthrene, 3rd edition, pages 99, 123, 125 and 231 (1949).